Feb. 14, 1933.                R. F. BACON                 1,897,921
                   PRODUCTION OF SULPHUR FROM SULPHIDES
                          Filed Oct. 21, 1927
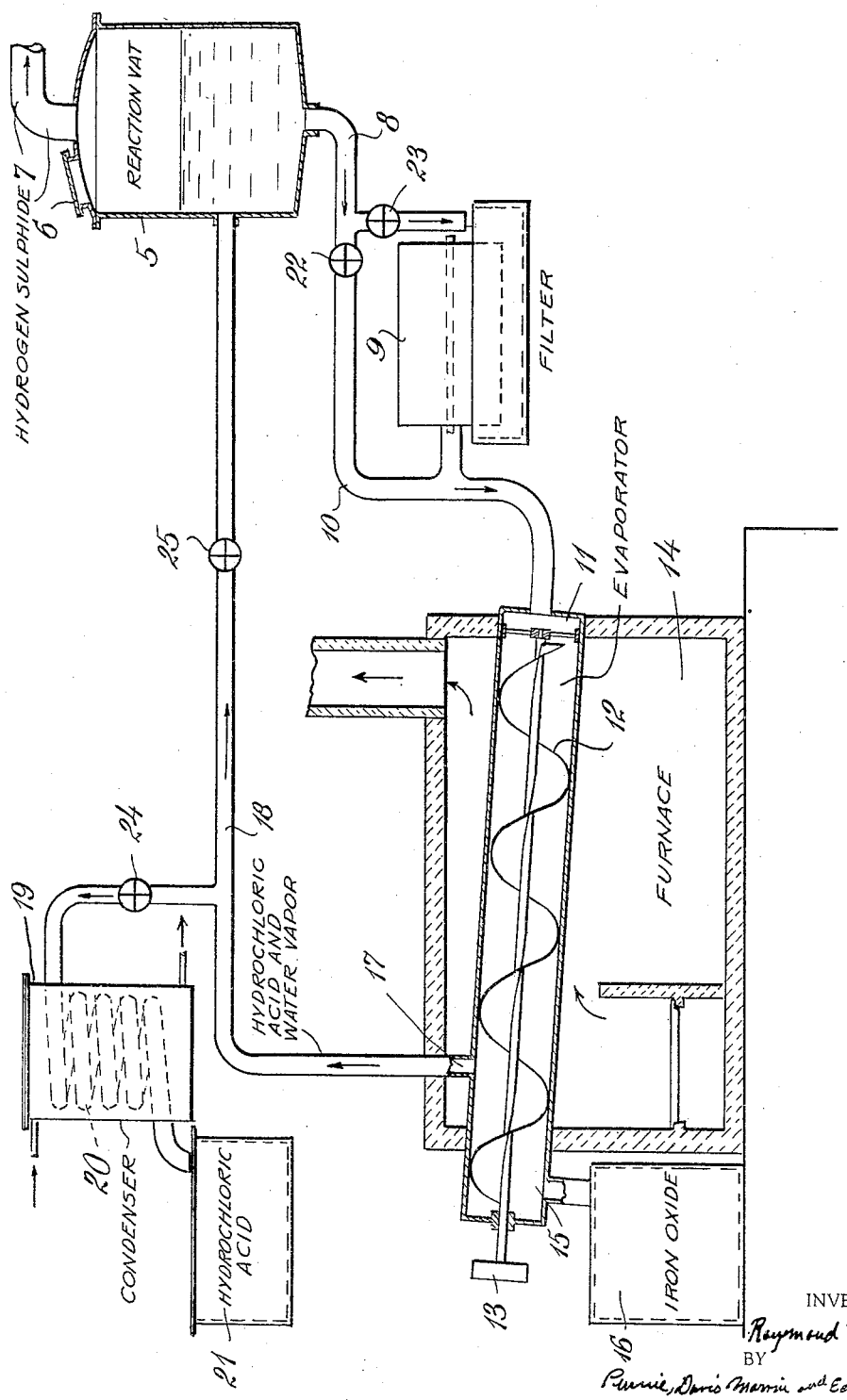
INVENTOR
Raymond F. Bacon
BY
Purrie, Davis, Marvin and Edmonds
ATTORNEYS Patented Feb. 14, 1933

1,897,921

UNITED STATES PATENT OFFICE

RAYMOND F. BACON, OF BRONXVILLE, NEW YORK

PRODUCTION OF SULPHUR FROM SULPHIDES

Application filed October 21, 1927. Serial No. 227,662.

This invention relates to the treatment of metallic sulphides for the production of elemental sulphur and other commercially valuable products such as metallic oxides. The invention is particularly adapted for the treatment of iron sulphides, but is also applicable to the treatment of other metallic sulphides, such as zinc sulphide and the like. The invention contemplates an improved method of releasing the combined sulphur in metallic sulphides, especially sulphide ores such as pyrites, blende and the like, and ultimately recovering the sulphur in elemental form and at the same time producing valuable metallic products such as metallic oxides.

The improved method of the invention involves generally the treatment of the metallic sulphide, for example, iron sulphide, with hydrochloric acid with the attendant evolution of hydrogen sulphide and the formation of a metallic chloride. The hydrogen sulphide gas is subjected to appropriate treatment, as for example, by reaction with sulphur dioxide gas, for the production and recovery of elemental sulphur. The metallic chloride remains in solution in the original reaction mixture, and is subjected to evaporation, with or without a preliminary purification operation, in the course of which the chloride is decomposed into a metallic oxide with the evolution of hydrochloric acid which is recovered for reuse in the process.

The metallic sulphides as they occur naturally in their ores may not be readily soluble in hydrochloric acid. In such cases the ore, or other material containing the metallic sulphide, is subjected to appropriate treatment for rendering the metallic sulphide readily soluble in hydrochloric acid. Thus, for example, in the treatment of iron pyrites, in which the iron sulphide approximates the formula $FeS_2$ and is not readily soluble in hydrochloric acid, I preliminarily subject the pyrites to appropriate treatment for converting the iron sulphide content thereof into a composition approximating the monosulphide of iron ($FeS$). Thus, an appropriate amount of sulphur may be removed from the pyrites by distillation, or by treatment of the pyrites with steam, or by partial oxidation of the pyrites with air, or the pyrites may be partially reduced by treatment with metallic iron. In any event, these preliminary operations involve such treatment of the original raw material as to render the metallic sulphide content thereof readily soluble in hydrochloric acid.

My present invention is based on the discovery that the metallic sulphides, when treated with hydrochloric acid evolve hydrogen sulphide gas, from which elemental sulphur can be effectively recovered, and at the same time form metallic chlorides which are capable of conversion by steam into metallic oxides with regeneration of hydrochloric acid. The chemical reactions involved are generally as follows:

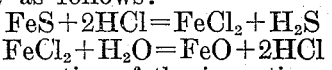
$$FeS + 2HCl = FeCl_2 + H_2S$$
$$FeCl_2 + H_2O = FeO + 2HCl$$

In the practice of the invention, the iron sulphide (of a composition soluble in hydrochloric acid) is treated with hydrochloric acid in a closed vessel which may be in the form of an ordinary vat. The hydrochloric acid immediately reacts with the iron sulphide forming iron chloride (probably largely ferrous chloride) and hydrogen sulphide. The hydrogen sulphide escapes from the vessel through a suitable vent in the top thereof and is subjected to appropriate further treatment for the recovery of elemental sulphur therefrom. I have found it desirable to use strong hydrochloric acid to react with the iron sulphide, as this avoids evaporation of an unnecessary amount of water in the succeeding stage of the process. The amount of hydrochloric acid used, as compared to the iron sulphide, is slightly more than that theoretically required by the chemical reaction. The reaction takes place at ordinary temperatures, but takes place more rapidly at somewhat higher temperatures. In practice sufficient heat is usually evolved during the reaction to provide the favorable higher temperature.

When the reaction between the iron sulphide and hydrochloric acid is completed there is left in the vessel iron chloride, mostly in solution, an excess of hydrochloric acid, and such impurities as were associated with the iron sulphide used in the process. These impurities may be in the form of insoluble siliceous residues, or partly in the form of chlorides of metals other than iron.

I have found it advantageous to provide alternative methods of treating the liquor remaining in the vat at the completion of the reaction with hydrochloric acid. The methods are fundamentally the same but differ in the means used to carry them out and are used alternately as the type of finished products demand. In one method a substantially pure iron oxide is obtained, while in the other method an iron oxide is produced containing substantially all the impurities present in the original sulphide. Economic factors and market demands largely determine the method best suited for the material in process.

In accordance with one of these alternative procedures, the whole material in the vessel, including solubles and insolubles, is run gradually and continuously into an evaporator of any appropriate acid proof construction. The evaporator may be heated in any appropriate manner, as for example, by a suitable furnace, or steam or electricity may be used for heating, since only a comparatively low temperature is required. In the evaporator, the water evaporates and during the evaporation the hot iron chloride in contact with steam is decomposed into iron oxide and hydrochloric acid; the hydrochloric acid escaping with the water vapor or steam.

It is advantageous to have the evaporator so constructed that the material in its passage through the evaporator encounters a gradually increasing degree of heat and it has further been found advantageous to cause the water vapor first evaporated to pass through the hottest part of the evaporator where the steam is superheated and reacts further with the highly heated chlorides until the chlorides are finally completely decomposed into oxide and hydrochloric acid which later escapes with the steam. Suitable means are provided on the evaporator for the escape of the hydrochloric acid and steam as well as a gas-tight discharge for the oxide formed by the reaction within the evaporator. The steam and hydrochloric acid generated in the evaporation process may be used to react with fresh sulphide in any desirable manner either directly as they issue from the evaporator or they may be condensed into a solution of hydrochloric acid which may be stored and later used in carrying out the dissolution of the sulphide.

The oxide, chiefly iron oxide, as discharged dry from the evaporator in this method carries with it whatever impurities are in the original sulphide ore. I have discovered that a satisfactory temperature for the hottest or discharge portion of the evaporator is about 240° C. which I have found to be sufficient to completely decompose the iron chloride into iron oxide and hydrochloric acid at a rapid rate.

In accordance with the other alternative method of treating the metallic chloride, the materials remaining in the vessel after treatment with hydrochloric acid are conducted to a filter, such as a continuous vacuum filter. The iron chloride and hydrochloric acid pass through the filter medium while the solid impurities remain thereon. The filtrate (iron chloride and hydrochloric acid) is then put through an evaporator in which the same reactions take place as hereinabove described, but the iron oxide obtained is of a very much purer character. Depending upon economic conditions, the obtaining of a purer form of iron oxide may justify the additional filtering operation. The material remaining on the filter medium may be washed with hydrochloric acid solution, or with water, or may not be washed at all, depending on calculable economic considerations. In case it is washed with water the residues on the filter go to waste.

In case it is washed with hydrochloric acid or is not washed at all, then the residues on the filter will usually be treated in an evaporator of the same form and character as that described and such treatment will recover such hydrochloric acid as is left in these residues.

Various forms of apparatus are available for the practice of the invention. In the single figure of the accompanying drawing, I have illustrated an apparatus satisfactory for the purpose.

The apparatus illustrated in the drawing comprises a reaction vat or vessel 5. The vat may be made of appropriate material adapted to withstand such corrosive influences as result from the reactions taking place between hydrochloric acid and the metallic sulphides. Earthenware or acid resistant metallic alloys are suitable for the purpose. The vat is provided with a sealed inlet 6 which may be opened to admit of the charging of fresh reaction material. At the top of the vat there is provided an outlet 7 through which the hydrogen sulphide gas, formed by the reaction with hydrochloric acid, may be withdrawn. The bottom of the vat 5 is provided with a valved and branched outlet 8 through which the residues may be withdrawn. The outlet 8 is connected to the filtering device 9 by which solid residues may be separated from the liquid portion of the material withdrawn from the vat 5. The outlet 8 is also connected to the by-pass line 10 in case it is found unnecessary to filter the residues.

The filtering device 9 and the by-pass line 10 are connected to the lower end of an inclined evaporator 11. The evaporator 11 is provided with a screw conveyor 12 which is operatively connected to a driving means in any appropriate manner, to wit, through the pulley 13.

The evaporator 11 is heated in any appropriate manner as by the furnace 14 which may be of any desired construction and the heat may be supplied either from ordinary fuels, such as coal or oil. Steam or electricity may be substituted for the furnace 14 as a source of heat.

The evaporator itself may be made of any appropriate material adapted to withstand the corrosive influences of the materials passing through it. Acid resistant metallic alloys are suitable for the purpose. In the bottom of the upper or discharge end of the evaporator there is provided an outlet 15 for solid materials in the nature of metallic oxides. The outlet 15 is connected by gas-tight connections with an oxide receiving bin 16. The receiving bin 16 may be provided with suitable means (not shown) for either intermittently or continuously withdrawing oxide which accumulates therein.

In the upper side of the discharge end of the evaporator there is provided an outlet 17 adapted to withdraw the water vapor and hydrochloric acid formed within the evaporator. The outlet 17 is provided with a branched valved pipe 18 so that the withdrawn gases may be either returned to the reaction vat 5 or by-passed through a condenser 19.

When the gases are passing through the condenser 19 the hydrochloric acid and water vapor are condensed in the coils 20 to hydrochloric acid. The hydrochloric acid flows from the coil 20 into a storage vat 21, from which it may be taken and either concentrated, diluted or returned directly to the start of the process in the reaction vat 5.

The operation of the apparatus will be understood from the foregoing description. The metallic sulphide and hydrochloric acid are passed into the reaction vat 5 through the inlet 6 provided for this purpose, whereupon the reaction immediately starts within the vat 5. The reaction produces the evolution of hydrogen sulphide gas which is withdrawn through the outlet 7 and at the same time iron or other metallic chloride is formed and held in solution in the vat 5. The reaction itself usually generates enough heat so that the reaction is carried to completion. However, if this does not take place the vat 5 may be heated in any appropriate manner as by steam coils, electricity or any other appropriate means. The hydrogen sulphide gas withdrawn from the vat 5 is subjected to appropriate treatment for the recovery of elemental sulphur therefrom. Thus, this gas may be mixed with sulphur dioxide gas in accordance with the method disclosed in my co-pending patent application, Serial No. 183,437, filed April 13, 1927.

The residue in the reaction vat 5, chiefly ferrous chloride in solution, when treating iron sulphide, is then withdrawn through the outlet 8 and if it is desired to filter insolubles from the mass, the valve 22 is closed and valve 23 opened, thus permitting the solution and impurities to flow through the filtering device 9, which removes all solid matter and permits nothing but the clear liquid solution to be carried on to the evaporator 11.

Where it is unnecessary to remove the solid residues, the valve 23 is closed and valve 22 opened permitting the liquor and residues from the reaction vat 5 to flow directly into the evaporator 11.

Material entering the lower end of the evaporator 11 is heated to a point where the water is evaporated. At the same time the screw conveyor 12 gradually carries the solid materials already in the liquor and solids formed by evaporation up the incline of the evaporator into the hotter portion thereof. As the chlorides are concentrated and enter the hotter portion of the evaporator, they are broken down in the presence of steam into oxides and free hydrochloric acid. The oxides are withdrawn from the upper or discharge end of the evaporator through the outlet 15, while the water vapor and hydrochloric acid pass off through the outlet 17 in the upper portion of the evaporator.

The hydrochloric acid and water vapor may be then directly returned to the reaction vat 5 by closing the valve 24 and opening the valve 25. If it is desired, however, to condense the steam and hydrochloric acid into liquid hydrochloric acid, the valve 25 is closed and valve 24 opened, thus permitting the exiting gases to pass through the cooling coils 20 of the condenser 19 where the two vapors are condensed into an aqueous solution of hydrochloric acid which is permitted to run into the storage vat 21. The hydrochloric acid in the storage vat 21 may be then either concentrated, or diluted, or run directly back to the start of the process in the reaction vat 5.

I do not wish to confine myself to the apparatus shown in the drawing. Various forms of leaching apparatus may be used for the reaction vat diagrammatically shown in the drawing. Continuous leaching of the metallic sulphide may be carried out by the use of continuous leaching apparatus. Any form of apparatus for evaporating a liquid and for heating up solid residues in the presence of steam may be used in place of the evaporator shown in the drawing. Any appropriate means for condensing steam and hydrachloric acid may be used. The apparatus illustrated is simply one form of apparatus satisfactory for the purpose.

As an alternative mode of operation air in regulated amounts may be put into the evaporator so as to oxidize the ferrous chloride to the ferric condition, the final products of the reaction, in that case, being ferric oxide and hydrogen chloride. This method of operation may be preferable as ferric chloride appears to hydrolize more rapidly than ferrous chloride at the temperature used, and ferric oxide is a desirable and usual form of iron oxide in commerce.

I claim:

In the cyclic method of treating metallic sulphide, dissolving the metallic sulphide and hydrochloric acid with the formation of hydrogen sulphide and metallic chloride, converting the metallic chloride into gaseous hydrochloric acid and a metallic oxide, conducting the gaseous hydrochloric acid direct to the dissolving vessel and introducing it into said dissolving vessel below the liquid level therein, whereby at least a portion of said gaseous hydrochloric acid is dissolved and caused to react with more metallic sulphide.

In testimony whereof I affix my signature.

RAYMOND F. BACON.